United States Patent [19]

Asahara et al.

[11] Patent Number: 4,805,997
[45] Date of Patent: Feb. 21, 1989

[54] GRADIENT REFRACTIVE INDEX TYPE ANAMORPHIC PLANAR MICROLENS AND METHOD OF PRODUCING THE SAME

[75] Inventors: Yoshiyuki Asahara, Tokyo; Shigeaki Omi, Saitama; Hiroyuki Sakai, Tokyo; Shin Nakayama, Tokyo; Yoshitaka Yoneda, Tokyo, all of Japan

[73] Assignee: Hoya Corporation, Tokyo, Japan

[21] Appl. No.: 868,696

[22] Filed: May 30, 1986

[30] Foreign Application Priority Data

May 31, 1985 [JP] Japan .................................. 60-116347
Jun. 6, 1985 [JP] Japan .................................. 60-123515

[51] Int. Cl.$^4$ .......................... G02B 3/00; G02B 13/08
[52] U.S. Cl. ....................................... 350/413; 350/420
[58] Field of Search ........................ 350/413, 420, 320

[56] References Cited

U.S. PATENT DOCUMENTS 4,684,222 8/1987 Borrelli et al. ...................... 350/417

OTHER PUBLICATIONS

*Distributed-Index Planar Microlens,* Oikawa et al., Applied Optics, vol. 21, No. 6, (Mar. 15, 1982) pp. 1052–1056.

Webster's II New Riverside University Dictionary, Copyright 1984, The Riverside Publishing Company, p. 425.

*Primary Examiner*—John K. Corbin
*Assistant Examiner*—Ronald M. Kachmarik
*Attorney, Agent, or Firm*—Cushman, Darby & Cushman

[57] ABSTRACT

The present invention provides a gradient refractive index type anamorphic planar microlens which can be utilized for collimating an elliptical beam radiated from a semiconductor laser, or the like, and a method of producing such a lens. To collimate light rays, in which astigmatism exists, it is necessary to use a lens in which the respective focal distances in the directions perpendicular to an optical axis are different from each other. It includes a semiellipsoidal refractive index distribution region formed in a transparent substrate so as to have a major axis and a minor axis on a surface of the transparent substrate.

6 Claims, 6 Drawing Sheets

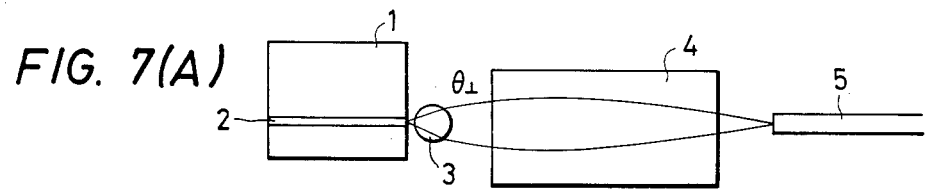
FIG. 7(A)
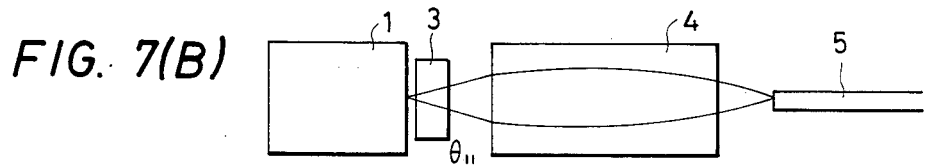
FIG. 7(B)
FIG. 8
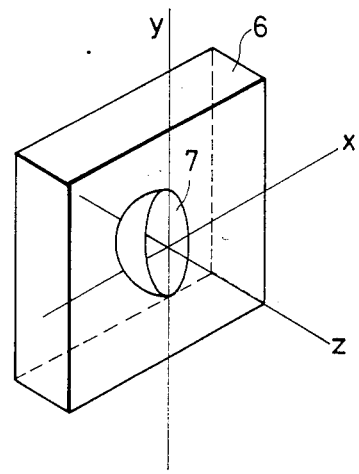

GRADIENT REFRACTIVE INDEX TYPE ANAMORPHIC PLANAR MICROLENS AND METHOD OF PRODUCING THE SAME

BACKGROUND OF THE INVENTION

1. Field of Invention

The present invention relates in general to microlenses of the type which can be used in a micro-optical system such as optical communication or the like. More particularly, the invention provides a gradient refractive index type anamorphic planar microlens. The microlens has a semiellipsoidal refractive index distribution region which is formed in a transparent substrate so as to have a major axis and a minor axis on a surface of the transparent substrate. The present invention is directed to both the microlens structure and a method of producing a gradient refractive index type anamorphic planar microlens.

2. Description of the Prior Art

As shown in FIG. 1, a gradient refractive index type planar microlens has a plate-like semitransparent substrate 1 in which are formed several refractive index distribution regions 2 each having a "lens" effect (acting as a lens). Each region 2 converges light as shown by arrows 3. The opposite surfaces of the lens are flat. This permits the lens to be more easily used than common spherical surface lenses or a non-spherical surface lens. A plurality of regions each acting as a "lens" can be simultaneously formed on the same substrate.

There has been proposed a lens in which the refractive index distribution regions are shaped to be semispherical, or semicylindrical.

Semiconductor lasers are widely used as an optical communication system light source. However, there occurs astigmatism in a beam 6 radiated from a semiconductor laser 4 as shown in FIGS. 2A and 2B. The beam is shown as being elliptical in section because the radiation angle is different in its expanding angles between the directions perpendicular to and parallel to an active layer 5. For use in an optical lens system to collimate such a beam as described above, a flat plate microlens having a semispherical refractive index distribution region is not optimum.

To collimate light rays having such elliptical expansion as described above into circular parallel light rays, it is possible to think about an optical system in which semicircular lenses are combined to be perpendicular to each other, however, the optical system becomes complicated with respect to the curvature and thickness of the lenses used in the optical system to collimate the light and therefore it is quite difficult to produce the lenses. For example, in the case of using a flat plate microlens having a semicylindrical refractive index distribution regions, it is necessary that lenses which are different in numerical aperture (N.A.) be placed one on the other so as to be perpendicular to each other.

SUMMARY OF THE INVENTION

An object of the present invention is to provide a gradient refractive index type anamorphic planar microlens which can be utilized for collimating an elliptical beam radiated from a semiconductor laser, or the like, and to provide a method of producing such a lens.

To collimate light rays, in which astigmatism exists, such as, for example those of a semiconductor laser, or the like, it is necessary to use a lens in which the respective focal distances in the directions perpendicular to an optical axis are different from each other. The present invention provides a flat plate microlens having such a characteristic. The invention provides a gradient refractive index type anamorphic planar microlens having a semiellipsoidal refractive index distribution region which is formed in a transparent substrate so as to have a major axis and a minor axis on a surface of the transparent substrate.

BRIEF DESCRIPTION OF THE DRAWINGS

FIGS. 7(A) and 7(B) are diagrams showing a conventional method of astigmatism correction;

FIG. 8 is a perspective view of an anamorphic planar microlens according to the present invention;

DETAILED DESCRIPTION OF PREFERRED EMBODIMENTS

Figure 1:
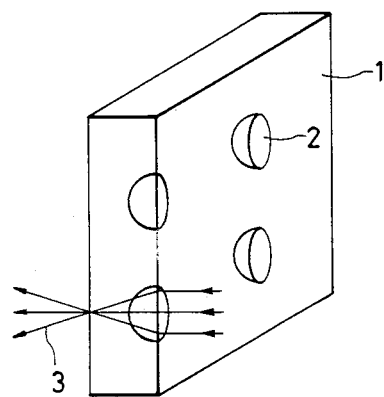
FIG. 1 (Prior Art) is a perspective view showing an ordinary flat plate microlens.
Figure 2A:
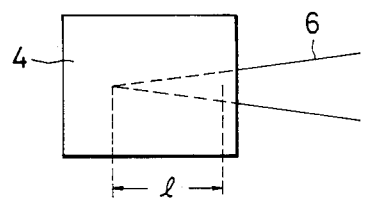
FIGS. 2A (Prior Art) and 2B (Prior Art) are, respectively, a plan view and a side view showing a semiconductor laser.
Figure 2B:
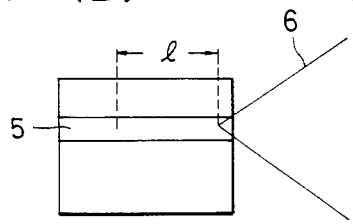
Figure 3A:
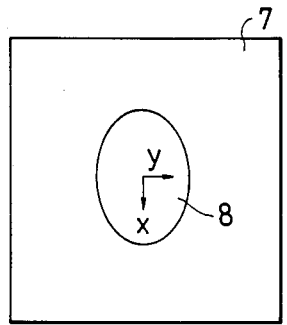
FIGS. 3A-3C are plan, front, and a side views, respectively, of a gradient refractive index type anamorphic planar microlens according to the present invention.
Figure 3B:
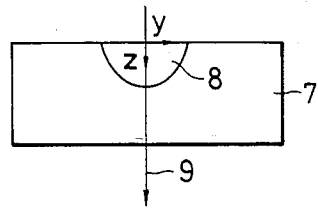
Figure 3C:
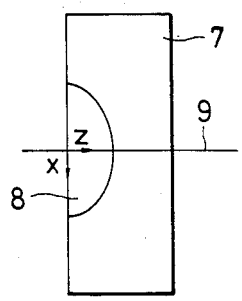

A lens according to the present invention has a semiellipsoidal refractive index distributiion region 8 formed in a plate-like transparent substrate 7 as shown in FIGS. 3A through 3C. The refractive index distribution is greatest at the center portion of the semiellipsoid and it gradually decreases with an increase of radial distance from the center as shown in FIG. 4.

Figure 4:
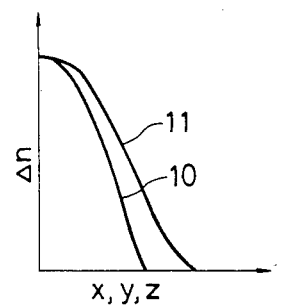
FIG. 4 is a graph showing a refractive index distribution of a lens according to the invention.

In FIG. 4, the reference numeral 10 designates a curve showing the refractive index distribution in the "y" and "z" directions. A curve 11 shows the refractive index distribution in the "x" direction. Although the optical axis is on a straight line passing through the center of semiellipsoid in the direction perpendicular to the substrate, the refractive index distribution is not rotationally symmetric with respect to the optical axis. The focal length varies depending on the direction within a plane perpendicular to the optical axis. The refractive index distribution is not uniform. The focal length in the major axial direction (x-direction) of the refractive index distribution region is longer than that in the minor axial direction (y-direction).

A method of producing the gradient refractive index type anamorphic planar microlens according to the present invention uses ion-exchange in glass. A mask having a predetermined shaped elliptical opening is attached to a surface of a plate-like glass body. Then, through the opening, ion exchange between ions causing a high refractive index and alkali ions in the glass body takes place, to thereby form a semi-ellipsoidal refractive index distribution region in the glass body.

Figure 5:
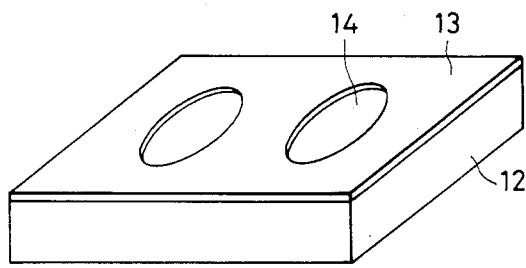
FIG. 5 is a perspective view showing an example of a glass substrate with a mask attached thereto which is suitable for use in a method of producing A gradient refractive index type anamorphic planar microlens according to the present invention.

First, as shown in FIG. 5, a mask 13 having elliptical openings 14 and being impervious to ions is attached to a surface of a glass substrate 12. A titanium film, or the like, obtained by spattering or vacuum-evaporation can be used as a mask material. The major and minor diameters of each of the opening portions must be selected in accordance with the characteristics of a desired lens, and the conditions of ion exchange. Next, the glass substrate is immersed into a molten salt composing ions such as silver, thallium, or the like, which cause a high refractive index, so as to perform ion exchange between the alkali ions such as k+, Na+, or the like, in the glass substrate and the ions contained in the molten salt and causing a high refractive index, through the elliptical openings formed in the mask. Through the ion exchange, semiellipsoidal refractive index distribution regions 8 each as shown in FIGS. 3A through 3C are formed in the glass substrate. After ion exchange, the mask 13 is removed and the surface of the glass body is polished to thereby produce a gradient refractive index type anamorphic planar microlens.

The following is a description of a working example of the invention. A titanium film of 1.3 $\mu$m thick was attached as a mask material on an optical glass known as TiF6 worked and polished into a plate-like shape of 5 mm thick, the optical glass being composed of 47.9% of $P_2O_5$, 19.8% of $Na_2O$, 7.7% of $K_2O$, 3.7% of $A_2O_3$, 15.4% of $TiO_2$, and 1.6% of others, respectively, represented by weight. Then, elliptic openings each having a major diameter of 200 $\mu$m and a minor diameter of 100 $\mu$m were formed in the mask by using photolithography. The thus prepared glass body with the mask was immersed in a molten salt composed of 40 weight % of $AgNO_3$ and 60 weight % of $KNO_3$ at 350° C. for 70 hr to perform ion exchange. After the ion exchange, the titanium mask was removed and the surface of the substrate was polished again to thereby obtain a gradient refractive index type anamorphic planar microlens having refractive index distribution regions, each shaped into a semiellipsoid having a major diameter of 1.29 mm, a minor diameter of 1.17 mm, and a depth of 0.57 mm, in the surface of the substrate. In the lens, the respective focal lengths in the major and minor diametrical directions were different from each other, the former being 2.47 mm and the latter being 2.04 mm.

The anamorphic flat plate microlens according to the present invention has a semiellipsoidal refractive index distribution region is described above, and therefore the lens can be used to collimate an elliptical beam radiated from a semiconductor laser, or the like. The microlens according to the present invention is produced by the following method. A mask having a predetermined shaped elliptical opening is attached to a surface of a plate-like glass body. Then, ion exchange is performed between ions causing a high refractive index and alkali ions in the glass body through the opening. Using this ion exchange technique, a flat plate microlens having a semielipsoidal refractive index distribution region can be produced easily.

Figure 6A:
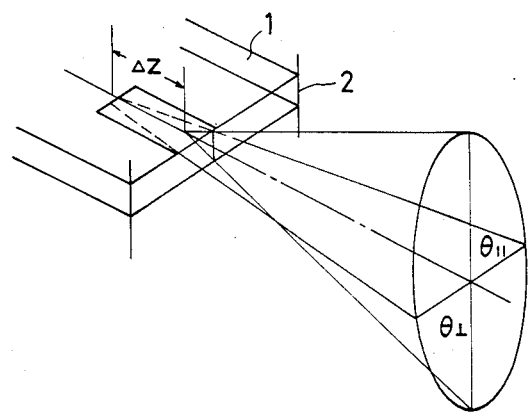
FIGS. 6(A) and 6(B) are diagrams showing the astigmatism of a semiconductor laser.
Figure 6B:
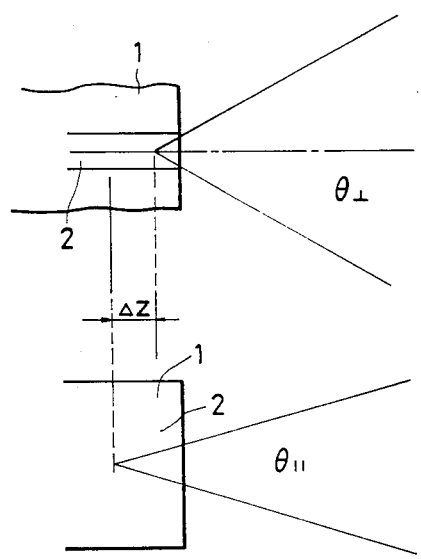

FIGS. 6(A) and 6(B) are diagrams showing the astigmatism of a semiconductor laser. Divergent light can be corrected by using an anamorphic lens according to the present invention. More specifically, the beam shape of light from a semiconductor laser can be corrected.

In a semiconductor laser which has become frequently used as a light source of optical communication or a laser disk recently, it is well known that if a laser beam is generated from an active layer 2 of a semiconductor laser 1, the beam in a direction 0 parallel to the junction plane of the semiconductor is located inwardly of a light emitting plane by a distance $\Delta Z$ causing an astigmatism. This astigmatism takes a value which is usually 5 $\mu$m or less in the case of the refractive index waveguide type. In the case of the gain waveguide type, however, the astigmatism is larger, for example 10-50 $\mu$m, so that it may be an obstacle when a laser beam is collimated or converged into a small spot. Therefore, conventionally, when a beam generated from a semiconductor laser is optically coupled with an optical fiber, a cylindrical lens 3 is disposed confocally only in the direction perpendicular to a junction plane 2 as shown in FIGS. 7(A) and (B) and combined with a rod lens 4 of the gradient refractive index type after the beam has been corrected only in the perpendicular direction, so as to effectively converge the beam onto an end surface of an optical fiber 5. In this case, an extremely small cylindrical lens having a radius of 3-5 $\mu$m is required and therefore not only the handling is difficult but there is also a strict restriction with respect to the positional relationship in connection with another rod lens as well as a mounting manner.

To control a beam of a semiconductor laser, a planar microlens having a semispherical refractive index distribution range can be used. In this method, however, it is impossible to eliminate astigmatism.

Figure 9A:
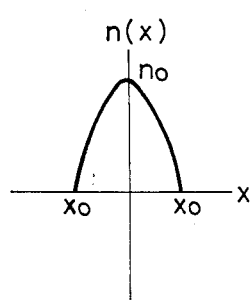
FIGS. 9(A), (B) and (C) are refractive index distribution diagrams of the semi-ellipsoidal lens portion.
Figure 9B:
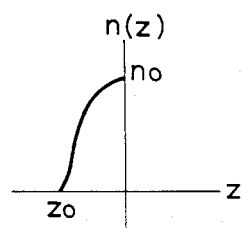
Figure 9C:
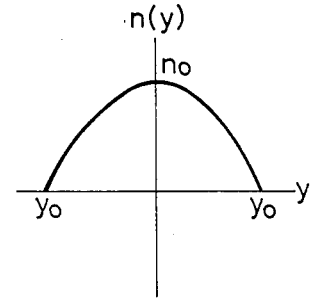

The disadvantage of prior art arrangements is overcome by using a semi-ellipsoidal anamorphic flat plate microlens according to the present invention. FIG. 8 is a perspective view of an anamorphic planar microlens 6 according to the invention. FIGS. 9(A), (B), and (C) show refractive index distribution characteristics of semi-ellipsoidal lens portion 7 of the anamorphic planar microlens. The anamorphic planar microlens is similar to an ordinary flat plate lens in that the refraction index decreases gradually toward the inside from the glass surface. However, in the former, the respective lengths of the refractive index gradient portion (lens portion) are different from each other between the x- and y-directions so that the refractive index gradient is also different between the x- and y-directions and therefore the lens portion has a semi-ellipsoidal shape.

Figure 10A:
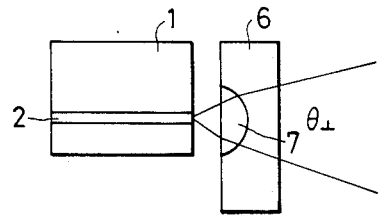
FIGS. 10(A) and (B) are explanatory diagrams showing an embodiment of the present invention.
Figure 10B:
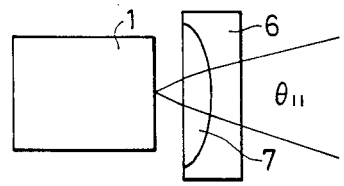

Such a lens is arranged such that, as shown in FIGS. 10(A) and (B). The direction perpendicular to the junction plane 2 of the semiconductor, that is, the direction 0 is made coincident with the X-direction of the lens 6 so as to be made confocal with the focal point in the x-direction of the lens and the direction parallel to the junction plane 2 of the semiconductor. In other words, the direction 0 is made coincident with the y-direction of the lens 6 so as to be made confocal with the focal point in the y-direction of the lens, so that it is possible to eliminate astigmatism.

Figure 11A:
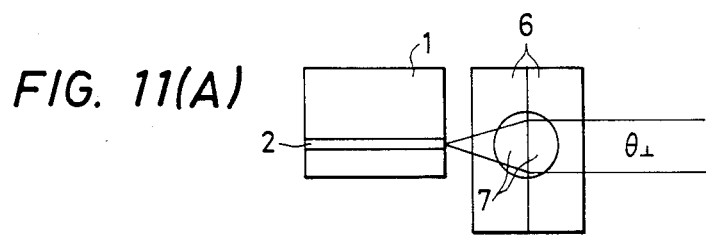
FIGS. 11(A) and (B) are explanatory diagrams showing another embodiment of the present invention.
Figure 11B:
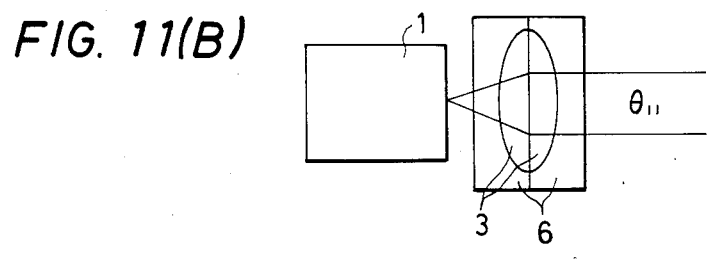

Two lenses may be attached to each other such that, as shown in FIGS. 11(A) and (B), the respective x-directions of the two leases are made coincident with each other and the respective y-directions of the same are also made coincident with each other, to make it possible to completely eliminate astigmatism. Further, a plurality of lenses may be superimposed one on one in the same manner as above so as to make it possible to effectively converge a laser beam with no astigmatism.

Figure 12:
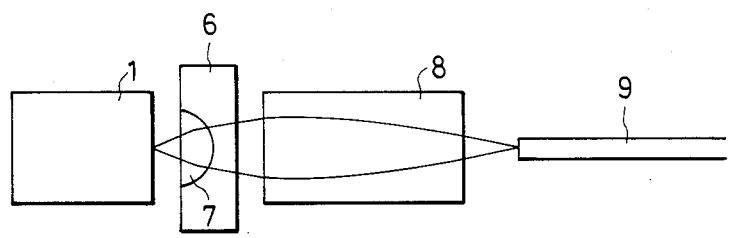
FIG. 12 is an explanatory diagram showing a semiconductor laser beam converged onto an optical fiber by using an anamorphic planar microlens according to the present invention.

Further, FIG. 12 shows an example in which after astigmatism has been eliminated by an anamorphic planar lens 6 according to the present invention. A laser beam is effectively converged on an end surface of an optical fiber 9 by using a rod lens 8 of the gradient refractive index type. Thus, the concepts of the present invention can be used in combination with any other lens as shown in the above example.

We claim:

1. A gradient refractive index type anamorphic planar microlens having a refractive index distribution region formed in a transparent substrate, said region having an optical axis perpendicular to a surface of said substrate, the refractive index of said region being maximum at the central point thereof where said optical axis intersects said substrate surface, and being gradually radially reduced from the central point, said refractive index distribution region in said transparent substrate being formed as a semiellipsoidal shape having a major and minor axes which are not equal on said surface of said substrate.

2. A microlens according to claim 1 wherein said substrate is made of glass.

3. An anamorphic lens for correcting divergent light comprising a transparent substrate with an anamorphic lens element formed therein, the lens element being shaped so that at a central portion thereof, the refractive index of the element is lager than that of said transparent member and the refractive index of the lens element decreases from said central portion toward the surface of said transparent member, the respective rates of decrease of the refractive index in the directions perpendicular (optical axis) and parallel to the surface of said transparent member being different from each other.

4. An anamorphic lens according to claim 3 wherein said substrate is made of glass.

5. A method of producing a gradient refractive index type anamorphic planar microlens comprising the steps of:
   applying a mask to a surface of a plate-like glass body, said mask having a predetermined shaped elliptical opening, having a major and a minor axis which are not equal; and
   immersing said glass body with said mask applied thereto into a molten salt containing ions for causing a high refractive index, to perform ion exchange through said opening to thereby form a semi-ellipsoidal refractive index distribution region, said region having a major and a minor axis which are not equal, said glass body resulting from a concentration distribution of said ions.

6. A method according to claim 5 wherein said step of immersing comprises the step of immersing said glass body into a molten salt containing ions from the group consisting of thallium and silver.

* * * * *